US007149247B2

(12) United States Patent
Sullivan

(10) Patent No.: US 7,149,247 B2
(45) Date of Patent: Dec. 12, 2006

(54) METHODS AND SYSTEMS FOR ENCODING AND DECODING VIDEO DATA TO ENABLE RANDOM ACCESS AND SPLICING

(75) Inventor: Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 10/350,145

(22) Filed: Jan. 22, 2003

(65) Prior Publication Data

US 2003/0156640 A1  Aug. 21, 2003

Related U.S. Application Data

(60) Provisional application No. 60/351,143, filed on Jan. 22, 2002.

(51) Int. Cl.
*H04B 1/66* (2006.01)
(52) U.S. Cl. .................................. 375/240.01
(58) Field of Classification Search ........... 375/240.01, 375/240, 240.25; 348/169; 386/52; 382/233
See application file for complete search history.

(56) References Cited

U.S. PATENT DOCUMENTS

| | | |
|---|---|---|
| 4,847,877 A | 7/1989 | Besseyre |
| 4,969,055 A | 11/1990 | Oberjatzas et al. |
| 5,027,206 A | 6/1991 | Vreeswijk et al. |
| 5,168,356 A | 12/1992 | Acampora et al. |
| 5,175,618 A | 12/1992 | Ueda et al. |
| 5,191,436 A | 3/1993 | Yonemitsu |
| 5,223,949 A | 6/1993 | Honjo |
| 5,543,847 A | 8/1996 | Kato |
| 5,586,200 A | 12/1996 | Devaney et al. |
| 5,661,665 A | 8/1997 | Glass et al. |
| 5,740,310 A | 4/1998 | De Haan et al. |
| 5,835,636 A * | 11/1998 | Auld .......................... 382/233 |
| RE36,015 E | 12/1998 | Iu |
| 5,870,444 A | 2/1999 | Mynett et al. |
| 5,898,897 A | 4/1999 | Son et al. |
| 5,946,043 A | 8/1999 | Lee et al. |
| 5,955,977 A | 9/1999 | Lei |
| 5,956,090 A | 9/1999 | Yamauchi |
| 5,970,173 A | 10/1999 | Lee et al. |
| RE36,507 E | 1/2000 | Iu |

(Continued)

FOREIGN PATENT DOCUMENTS

EP        0 886 398 A1    12/1998

(Continued)

OTHER PUBLICATIONS

U.S. Appl. No. 60/341,674, filed Dec. 17, 2001, Lee et al.

(Continued)

*Primary Examiner*—Tung Vo
(74) *Attorney, Agent, or Firm*—Klarquist Sparkman, LLP

(57) ABSTRACT

Various embodiments provide approaches that facilitate decoding in the context of video coding standards that allow for complicated dependencies among pictures of an encoded sequence of pictures. In some embodiments, the notion of a random access point or "RAP" is utilized. A random access point is effectively a location within a picture sequence that contains information that facilitates random access of the sequence. In some embodiments, a random access point can contain different types of data. Such data can be defined, in some embodiments, in terms of picture count and/or time. In some embodiments, a random access point's data can comprise one or more of an entry point and a recovery point. These points effectively provide measures that a decoder can use to ascertain when its decoding activities will result in accurately and suitably decoded pictures.

59 Claims, 6 Drawing Sheets

U.S. PATENT DOCUMENTS

| | | | |
|---|---|---|---|
| 6,075,576 | A | 6/2000 | Tan et al. |
| 6,169,573 | B1 * | 1/2001 | Sampath-Kumar et al. . 348/169 |
| 6,201,927 | B1 | 3/2001 | Comer |
| RE37,222 | E | 6/2001 | Yonemitsu et al. |
| 6,266,158 | B1 | 7/2001 | Hata et al. |
| 6,301,428 | B1 * | 10/2001 | Linzer .................... 386/52 |
| 6,330,214 | B1 | 12/2001 | Ohta et al. |
| 6,380,991 | B1 * | 4/2002 | Teichmer ............ 375/240.01 |
| 6,414,998 | B1 * | 7/2002 | Yoshinari et al. ...... 375/240.25 |
| 6,415,326 | B1 | 7/2002 | Gupta et al. |
| 6,499,060 | B1 | 12/2002 | Wang et al. |
| 6,728,317 | B1 | 4/2004 | Demos |
| 6,873,629 | B1 | 3/2005 | Morris |
| 6,912,251 | B1 * | 6/2005 | Ward et al. ................ 375/240 |
| 6,985,188 | B1 * | 1/2006 | Hurst, Jr. .................. 348/553 |
| 2003/0156640 | A1 * | 8/2003 | Sullivan ............... 375/240.01 |

FOREIGN PATENT DOCUMENTS

| | | |
|---|---|---|
| EP | 0 948 214 A2 | 10/1999 |
| EP | 1 018 840 A2 | 7/2000 |
| EP | 1043892 A1 | 10/2000 |
| EP | 1 069 777 A1 | 1/2001 |
| EP | 1 079 631 A1 | 2/2001 |
| EP | 1 111 932 A2 | 6/2001 |
| WO | WO 99/56472 | 11/1999 |
| WO | WO 00 56077 A | 9/2000 |
| WO | WO 00/64186 | 10/2000 |

OTHER PUBLICATIONS

Reader, "History of MPEG Video Compression—Ver. 4.0" 99 pp., document marked Dec. 16, 2003.

Sun, H., et al., "Architectures for MPEG Compressed Bitstream Scaling," *IEEE Transactions on Circuits and Systems for Video Technology*, vol. 6, No. 2, pp. 191-199 (Apr. 1996).

Printouts of FTP directories from http://ftp3.itu.ch , 8 pp. (downloaded from the World Wide Web on Sep. 20, 2005.).

Miranda Technologies Inc., "Time Code Processor/TCP-101i: Guide to Installation and Operation," Nov. 1999, pp. 1-47, Canada.

Williams, Richard, "All in Good Timecode. To edit video with precision you need to understand the numbers," Adobe Magazine, Spring 1999, pp. 57-59.

Lei, Shaw-Min, "The construction of efficient variable-length codes with clear synchronizing codewords for digital video applications," SPIE vol. 1605, Visual Communications and Image Processing '91: Visual Communication, Nov. 11, 1991, pp. 863-873.

Stockhammer, Thomas et al., "H.26L/JVT Coding Network Abstraction Layer and IP-Based Transport," Proceedings 2002 Int'l. Conference on Image Processing, ICIP 2002, IEEE, Sep. 22-Sep. 25, 2002, pp. 485-488.

Joint Video Team of ISO/IEC MPEG and ITU-T VCEG, "Study of Final Committee Draft of Joint Video Specification (ITU-T Rec. H.264, ISO/IEC 14496-10 AVC," 257 pp. (Document dated Dec. 2002) [Downloaded from the World Wide Web on May 6, 2005].

Joint Video Team of ISO/IEC MPEG and ITU-T VCEG, "Joint Model No. 1, Revision 1 (JM-1r1)," 80 pp. (Document dated Jan. 2002) [Downloaded from the World Wide Web on May 6, 2005].

ITU-T, "ITU-T Recommendation H.320: Infrastructure of Audiovisual Services—Systems and Terminal Equipment for Audiovisual Services: Narrow-band Visual Telephone Systems and Terminal Equipment," 31 pp. (1999).

ISO/IEC, "ISO/IEC 13818-2: Information Technology—Generic Coding of Moving Pictures and Associated Audio Information: Video—Amendment 1: Content Description Data," 23 pp. (Document dated Dec. 2001).

Suzuki et al., "Tool to Support Random Access," ITU-T, Study Group 16, Question 6, 3 pp. (Document dated Dec. 2001) [Downloaded from the World Wide Web on May 6, 2005].

Suzuki et al., "Group of Pictures for JVT Codec," ITU-T, Study Group 16, Question 6, 4 pp. (Document dated Jan. 2002) [Downloaded from the World Wide Web on May 6, 2005].

Suzuki, "AHG Report: GOP Syntax," ITU-T, Study Group 16, Question 6, 1 p. (Document dated Dec. 2002) [Downloaded from the World Wide Web on May 6, 2005].

Sullivan, "Header-Level Needs for H.26L," ITU-T, Study Group 16, Questions 15/16, 6 pp. (Dec. 2001).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Mar. 16, 2004].

ITU-T, "ITU-T Recommendation H.261: Video Codec for Audiovisual Services at px64 kbits," 28 pp. (1993).

ITU-T, "ITU-T Recommendation H.262: Information Technology—Generic Coding of Moving Pictures and Associated Audio Information: Video1," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

ISO/IEC, "ISO/IEC 13818-6: Information Technology—Generic Coding of Moving Pictures and Associated Audio Information—Part 6: Extensions for DSM-CC," pp. ii-9, 136-147, 204, 205, 222-224, 279-290, 311-318, 399-401 (1998).

ISO/IEC, "ISO/IEC 13818-1: Information Technology—Generic Coding of Moving Pictures and Associated Audio Information: Systems," 174 pp., (2000).

ISO/IEC, "ISO/IEC 13818-4: Information Technology—Generic Coding of Moving Pictures and Associated Audio Information—Part 4: Conformance testing," 79 pp. (1998).

ISO/IEC, "DSM-CC FAQ Version 1.0," 12 pp. (1997) [Downloaded from the World Wide Web on Nov. 12, 2004].

Anderson, D.B., "A Proposed Method for Creating VCR Functions Using MPEG Streams," Data Engineering, 1996. Proceedings of the 12th International Conference on—New Orleans, LA, USA Feb. 26-Mar. 1, 1996, Los Alamitos, CA, USA, IEEE Comput. Soc., US, Feb. 26, 1996, pp. 380-382.

* cited by examiner $I_0$ $B_1$ $B_2$ $P_3$ $B_4$ $B_5$ $P_6$ $B_7$ $B_8$ $I_9$ $B_{10}$ $B_{11}$ $P_{12}$ $B_{13}$ $B_{14}$ $P_{15}$ $B_{16}$ $B_{17}$ $I_{18}$ $B_{19}$ $B_{20}$ $P_{21}$ $I_0$ $P_3$ $B_1$ $B_2$ $P_6$ $B_4$ $B_5$ $I_9$ $B_7$ $B_8$ $P_{12}$ $B_{10}$ $B_{11}$ $P_{15}$ $B_{13}$ $B_{14}$ $I_{18}$ $B_{16}$ $B_{17}$ $P_{21}$ $B_{19}$ $B_{20}$ ↑ Random Access

Random Access

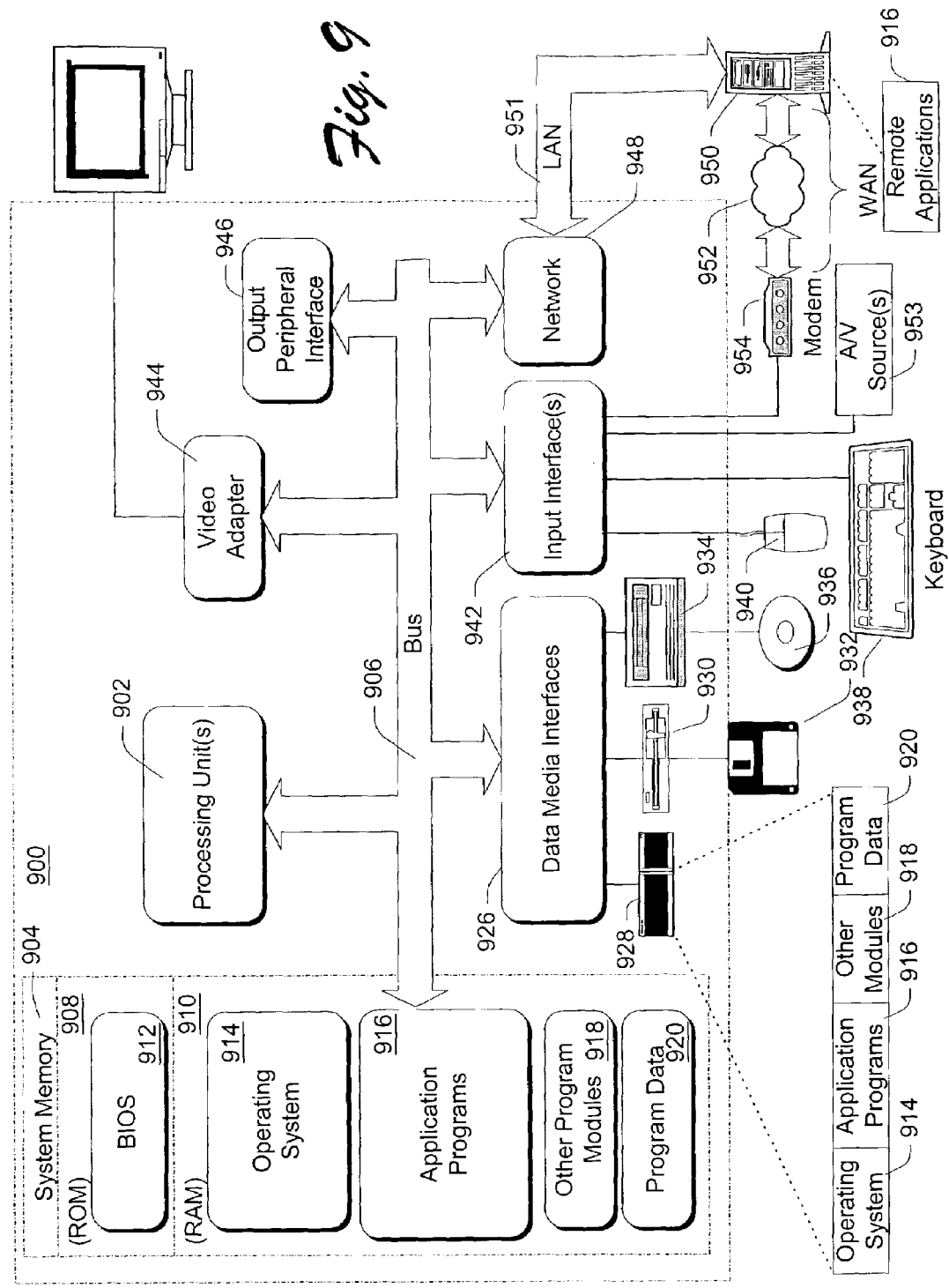

METHODS AND SYSTEMS FOR ENCODING AND DECODING VIDEO DATA TO ENABLE RANDOM ACCESS AND SPLICING

RELATED APPLICATION

This application claims the benefit of U.S. Provisional Application No. 60/351,143, filed Jan. 22, 2002.

TECHNICAL FIELD

This invention relates to methods and systems for encoding and decoding data.

BACKGROUND

Digital data is typically transmitted from some type of transmitter to some type of receiver. Transmitters typically include an encoder that encodes the data for transmission; and receivers typically include a decoder that decodes data that it receives. There are different types of digital data such as video data, audio data, audio/video data and the like. When digital data is transmitted, it is typically transmitted in some type of channel.

The predominant video compression and transmission formats are from a family called hybrid block-based motion-compensated transform video coders, examples of which include the video coding standards of the ITU-T VCEG (Video Coding Experts Group) and ISO/IEC MPEG (Moving Picture Experts Group) organizations—including H.261, MPEG-1, H.262/MPEG-2 Video, H.263, MPEG-4 Visual, and the in-process draft standard H.264/AVC. Coding and compression standards have also been specified for many other types of media including still pictures, audio, documents, web pages, and such, and for multiplexing together and synchronizing such signals.

The most widely used video coding standard is H.262/MPEG-2 Video, which we will use as a reference example herein. Generally, an MPEG-2 video stream is composed of three types of frames or pictures. In this document, we use the term "picture". The three types of MPEG-2 pictures are:
intra pictures (I-pictures);
predictive pictures (P-pictures); and
bi-directionally predictive pictures (B-pictures).

An MPEG-2 video stream or sequence is typically defined by segments called Groups of Pictures (GOPs). Typically, a GOP consists of a set of pictures of ½ second duration when displayed at their intended speed.

FIG. 1 illustrates the beginning of an MPEG-2 video stream consisting of a sequence of pictures ordered and indexed from left to right in the order in which the pictures will be displayed and starting with an I-picture 100 ($I_0$). In this example the first GOP starts with the first I-picture 100 ($I_0$) and contains subsequent pictures up to and including the last P-picture 160 ($P_6$) that precedes the next I-picture 190 ($I_9$). The second GOP starts with the first B-picture 170 ($B_7$) that precedes the second I-picture 190 ($I_9$). The first example GOP in this example sequence includes one I-picture; two P-pictures; and four B-pictures. Each GOP includes one or more consecutive pictures beginning with an I-picture such as picture 100 ($I_0$) that is not immediately-preceded by a B-picture or beginning with the first B-picture such as 170 ($B_7$) in a sequence of one or more consecutive B-pictures that immediately precedes an I-picture, such as 190 ($I_9$).

Decoding typically begins by decoding the first I-picture of any GOP, essentially independent of any preceding GOPs—for example, at I-picture 100 ($I_0$) in the first GOP or at I-picture 190 ($I_9$) in the second GOP. There is no specific limit to the number of pictures which may be in a GOP, nor is there a requirement for an equal number of pictures in all GOPs in a video sequence.

MPEG-2 I-pictures and P-pictures are called "anchor" pictures (or "key" pictures). An I-picture can be decoded independently of any other pictures. It does not rely on data from any other picture to construct its image. An MPEG-2 P-picture such as picture 130 ($P_3$) requires data from one previously decompressed anchor picture (e.g., I-pictures or P-pictures) to enable its decompression. While it is dependent, it is only dependent on one anchor picture that has already been decoded.

An MPEG-2 B-picture such as picture 110 ($B_1$) requires data from both preceding and succeeding anchor pictures (e.g., I-pictures or P-pictures) to be decoded. That is, an MPEG-2 B-picture is bi-directionally dependent.

In FIG. 1, the ends of the arrows indicate the picture(s) from which the arrow-pointed picture is dependent. For example, B-picture 140 ($B_4$) is dependent upon P-picture 130 ($P_3$) and P-picture 160 ($P_6$).

Now consider the picture sequence of FIG. 2 which illustrates the display order of the same sequence of individual I-, B- and P-pictures, in which some additional pictures are shown after the last picture shown in FIG. 1 and in which the beginning of a third GOP is shown starting with picture $B_{16}$. The display order is the order in which the pictures are to be displayed. So, for example, if one were displaying the individual pictures, $I_0$ would be the first picture displayed, followed by $B_1$, $B_2$ and so on. Notice, however, that if one looks at the sequence from the standpoint of those pictures that are predicted (i.e. the B-pictures), in order to decode a B-picture, the decoder must refer to the decoded value of an I-picture or P-picture that follows after it in time. So in this example, in order to decode $B_2$, the decoder will refer to both $I_0$ and $P_3$. That is, the decoder will have to decode both $I_0$ and $P_3$ in order to decode $B_2$.

Accordingly, the encoder typically transmits the pictures in a different order than the display order, so that the decoder can decode them as it receives them. For example, FIG. 3 illustrates the transmission order or decoding order of the FIG. 2 sequence. Because the decoder has to decode I-pictures and P-pictures before the B-pictures that reference them, the I-pictures and P-pictures are sent before the B-pictures that reference them. Here, notice that $P_3$ is sent before $B_1$, and $B_2$ that reference it. Thus, when the decoder receives the sequence in its transmission order, it can first decode $I_0$ and then $P_3$ which references $I_0$. Next, because it has decoded both $I_0$ and $P_3$, the decoder can now decode $B_1$ and $B_2$. Once the decoder has decoded a sufficient number of pictures, it will rearrange the pictures into display order for displaying. In the example, the decoder can accomplish the rearrangement by having its decoding process for I-pictures and P-pictures lag one anchor picture behind its display process (allowing the display of $I_0$ after the decoding of $P_3$, the display of $B_1$ immediately after decoding it, the display of $B_2$ immediately after decoding it, the display of $P_3$ after the decoding of $P_6$, the display of $B_4$ immediately after decoding it, the display of $B_5$ immediately after decoding it, the display of $P_6$ after the decoding of $I_9$, the display of $B_7$ immediately after decoding it, etc.).

Now consider the situation in which the FIG. 3 sequence is randomly accessed. For example, assume that a user is watching, on a digital television, a program that has been encoded as described above and suddenly changes the channel to another encoded program. If the decoder attempts to access the sequence at a B-picture, the decoder will be unable to decode the B-picture because it does not have the information that the B-picture refers to, e.g. the previous-in-time I-picture or P-picture. Similarly, if the decoder randomly accesses the sequence at a P-picture, it will be unable to decode it because it will not have the previous-in-time P- or I-picture to which it refers. Thus, in the encoding scheme described above, the decoder will not be able to properly decode pictures within the sequence until it detects an I-picture. So typically what the decoder will do is scan forward in the sequence until it locates an I-picture. Once it locates an I-picture, it can start decoding and decode the I-picture properly. Then, after detecting and decoding one additional subsequent anchor picture, it can start displaying good quality pictures from that point forward, as all pictures that follow that point in decoding order will be decodable and as it has fulfilled its degree of lag necessary to rearrange the pictures out of decoding order into display order.

For example, assume that in FIG. 3, the decoder randomly accesses the picture sequence at picture $P_3$. At this point, because $P_3$ depends on $I_0$ and the decoder does not have $I_0$, it will not be able to decode $P_3$. The system then waits until it gets to the $I_9$ picture which it knows it can decode. Following the $I_9$ picture, the decoder receives the $B_7$ and $B_8$ pictures which depend on $P_6$ and $I_9$. Although the system does have $I_9$, it does not have the $P_6$ picture. That is, although the decoder received the $P_6$ picture, this picture depends on $P_3$ which, in turn depends on $I_0$. Since the decoder was not able to decode $P_3$, it will not be able to decode $P_6$, $B_7$ and $B_8$.

The next picture the system receives is $P_{12}$ which depends only on $I_9$. Accordingly, the system can decode $P_{12}$. Once the system decodes $P_{12}$, it will then receive, and can decode, pictures $B_{10}$ and $B_{11}$. Accordingly, from this point onward in the transmission order, all of the pictures can be suitably decoded and displayed.

Accordingly, randomly accessing an encoded sequence, such as one encoded as described above, does not always provide instantly decodable and displayable pictures.

One of the mechanisms that MPEG-2 provides to assist in random accesses is known as a "closed GOP flag". Specifically, on individual I-pictures, a closed GOP flag can be provided by the encoder that indicates whether any subsequent pictures in the transmission order (after the I-picture) refer to a picture previous to the I-picture. That is, if the closed GOP flag is "true", then the GOP is closed and any B-pictures that follow the I-picture in decoding order (if there are any B pictures), do not refer to any pictures previous to the I-picture in decoding order. Thus, a closed GOP means that the GOP is self-contained and can be decoded by the decoder. Thus, even though one could, in the B-pictures, refer to a previous-in-order picture, the closed GOP flag indicates that this was not actually done when it was encoded. If, on the other hand, the closed GOP flag is false, this means that the GOP is not closed and tells the decoder that the B-pictures depend on pictures and data that the decoder does not have. Accordingly, the decoder knows that it cannot decode the next following B-pictures (any B-pictures that follow in decoding order prior to the next anchor picture). In this situation, the decoder would decode the I-picture, and then skip over the next B-pictures and decode the P-picture. After this point, the decoder has recovered and can start displaying video and decoding any subsequent B-pictures. In the example sequence shown in FIG. 3, the GOP that starts with picture $I_0$ is closed, while the GOPs that start with pictures $I_9$ and $I_{18}$ may or may not be closed (depending on whether the B-pictures that immediately follow each of those I-pictures in decoding order use prediction from the picture previous to the I-picture).

As video coding and decoding standards evolve and grow more complex, continuing challenges are posed to provide and enhance functionalities, such as random accessibility, without degrading the user's experience. Accordingly, this invention arose out of concerns associated with providing improved methods and system for encoding and decoding digital data.

SUMMARY

Various embodiments provide approaches that facilitate decoding in the context of video coding methods that allow for complicated dependencies among pictures of an encoded sequence of pictures. In some embodiments, the notion of a random access point or "RAP" is utilized. A random access point is effectively a location within a picture sequence that contains information that facilitates random access of the sequence. In some embodiments, a random access point can contain different types of data. Such data can be defined, in some embodiments, in terms of picture count and/or time. In some embodiments, a random access point's data can comprise one or more of an entry point and a recovery point. These points effectively provide measures that a decoder can use to ascertain when its decoding activities will result in accurately and suitably decoded pictures.

BRIEF DESCRIPTION OF THE DRAWINGS

FIG. 9 is a high level diagram of a computing environment in connection with which one or more embodiments can be implemented.

DETAILED DESCRIPTION

Overview

Figure 1:
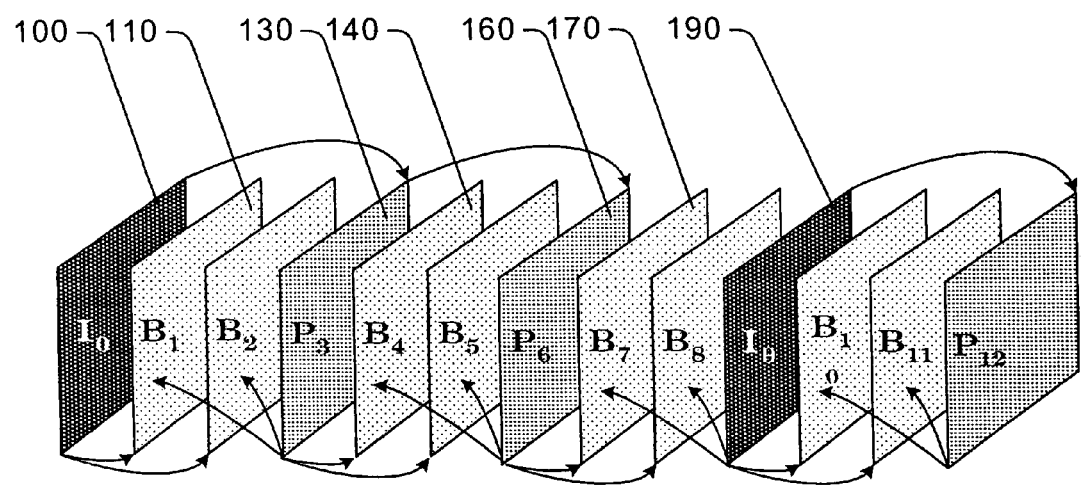
FIG. 1 is a diagram that illustrates I-, B-, and P-pictures in accordance with one prior art encoding format.

The embodiments described below provide an approach that facilitates decoding in the context of video coding standards that allow for complicated dependencies among pictures of an encoded sequence of pictures. Introduced is the notion of a random access point or "RAP". A random access point is effectively a location within a picture sequence that contains information that facilitates random access of the sequence.

The random access point can contain one or more types of information that can be utilized by a decoder to facilitate randomly accessing the sequence and decoding pictures within it. One type of information that a random access point can contain is referred to as an entry point or EP. Another type of information that a random access point can contain is referred to as a recovery point or RP. As the random access point can contain one or more types of information, it follows that the random access point can contain either or both of an entry point and a recovery point. And, although the concepts of entry points and recovery points are discussed below, it is to be appreciated and understood that these two types of information constitute but examples of specific types of information that can be included in a picture sequence. Accordingly, other types of information can be included without departing from the spirit and scope of the claimed subject matter.

Entry and recovery points effectively provide measures that a decoder can use to ascertain when its decoding activities will result in accurately and suitably decoded pictures. This will become more apparent as the description below is read. It is possible that some of the techniques described herein can be employed in connection with data that is not video such, e.g. audio data.

Exemplary Video Coding Standard with Which Inventive Embodiments can be Employed Before describing aspects of the inventive embodiments, it will be useful to discuss one video coding standard with which the inventive embodiments can be used. The video coding standard described below is the work of the Joint Video Team (JVT) standard development project, which is a joint project of the ITU-T Video Coding Experts Group (VCEG) and the ISO/IEC Moving Picture Experts Group (MPEG) for the development of a new video coding standard. The JVT project was created in December of 2001 to take over the work previously under way in the ITU-T H.26L project of VCEG and create a final design for standardization in both the ITU-T and MPEG. The main goals of the JVT/H.26L standardization effort are the definition of a simple and straightforward video coding design to achieve enhanced compression performance and provision of a "network-friendly" packet-based video representation addressing "conversational" (i.e., video telephony) and "non-conversational" (i.e., storage, broadcast, or streaming) applications. Hence, the JVT/H.26L design covers a Video Coding Layer (VCL), which provides the core high-compression representation of the video picture content, and a Network Abstraction Layer (NAL), which packages that representation for delivery over a variety of networks. The VCL design has achieved a significant improvement in rate-distortion efficiency—providing approximately a factor of two in bit-rate savings against existing standards. The NAL designs are being developed to transport the coded video data over existing and future networks such as circuit-switched wired networks, MPEG-2/H.222.0 transport streams, IP networks with RTP packetization, and 3G wireless systems. Upon approval, the JVT standard is expected to be designated as ITU-T Recommendation H.264 and as ISO/IEC 14496-10 "Advanced Video Coding".

The video coding standard about to be described still utilizes the concept of I-, B-, and P-pictures, but defines them in a different, more complex manner. A good perspective from which to appreciate the presently-described video coding standard is from the MPEG-2 perspective described above. Recall that the MPEG-2 standard provided for the following encoding/decoding paradigm briefly summarized here:

An I-picture can be decoded independently of any other pictures (e.g., P- and B-pictures); and, in decoding order, the first picture in a GOP is an I-picture.

A P-picture requires data from exactly one previously decompressed anchor picture (e.g., I-pictures or P-pictures) to enable its decoding; and the anchor picture used in the decoding of the P-picture is the last anchor picture that precedes the P-picture in order; and it precedes the P-picture in both transmission order and display order.

A B-picture requires data from two anchor pictures (e.g., I-pictures or P-pictures) to enable its decoding. These are the last two anchor pictures that precede B picture in transmission order, the first of which is a preceding picture in display order and the second of which is a succeeding picture in display order.

Figure 2:
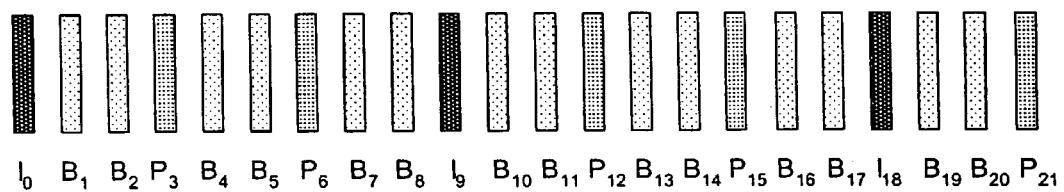
FIG. 2 illustrates a picture sequence comprising I-, B-, and P-pictures in a display order.

In accordance with the JVT paradigm for video encoding and decoding, an I-picture still represents an independently-decodable picture. A P-picture, however, is defined somewhat differently. According to the new standard, a P-picture can have more than one reference picture, whereas before it had only one previous reference picture. Specifically, each region of a P-picture has one reference picture, but collectively the individual regions of a P-picture can reference different pictures. Thus, as a whole, an individual P-picture can reference different pictures. For example, using the sequence of FIG. 2, it is now possible for picture $P_6$ to reference both pictures $P_3$ and $I_0$. In addition to referencing multiple pictures, an individual P-picture may also reference future pictures in display order. For example, some regions of the $P_6$ picture could be predicted from pictures $I_0$, $P_3$ and $I_9$, where picture $I_9$ is a picture in the future in display order relative to picture $P_6$. Thus, the number of pictures that a P-picture can depend on and the ordering of those pictures in display order is almost arbitrary within the limits of the decoder capacity to store pictures.

Additionally B-pictures are defined somewhat differently. First, in the previous definition, a B-picture had two reference pictures. In that prior design, the decoding process of each region of a B-picture such as picture $B_1$ could reference a region of its preceding or succeeding anchor picture in display order, such as picture $I_0$ or $P_3$, or could reference a region in both of them to form some mathematical average between them. In the new B-picture definition, this concept is retained (i.e. each region being capable of referencing one particular region of a previously-decoded picture or the average of two such regions), but now is generalized to be able to select these one or two regions for the decoding of each region of the B-picture from any number of pictures (i.e. 1 or more pictures that precede the B-picture in decoding order). Thus, instead of referring to just two pictures, the B-picture can refer to any reasonable number of pictures and/or a mathematical combination of any reasonable number of pictures. So, for example, with reference to the FIG. 2 sequence, picture $B_2$ can reference pictures $I_0$, $P_3$, and $I_9$ and, between these three reference pictures it can refer, for decoding any region in the B-picture, to a single region of one of those reference pictures or to a mathematical average between two such regions of those pictures.

Additionally, a B-picture is now different from the old standard in that in the old standard, B-pictures were not used as anchor pictures for the decoding of other pictures. In accordance with the standard being now described, B-pictures can be stored for use as a reference and the decoding process of other pictures can depend on them. For example, the decoding process for picture $B_4$ in FIG. 2 could refer to the content of pictures $B_2$, $P_3$, $B_5$, and $P_6$.

Figure 4:
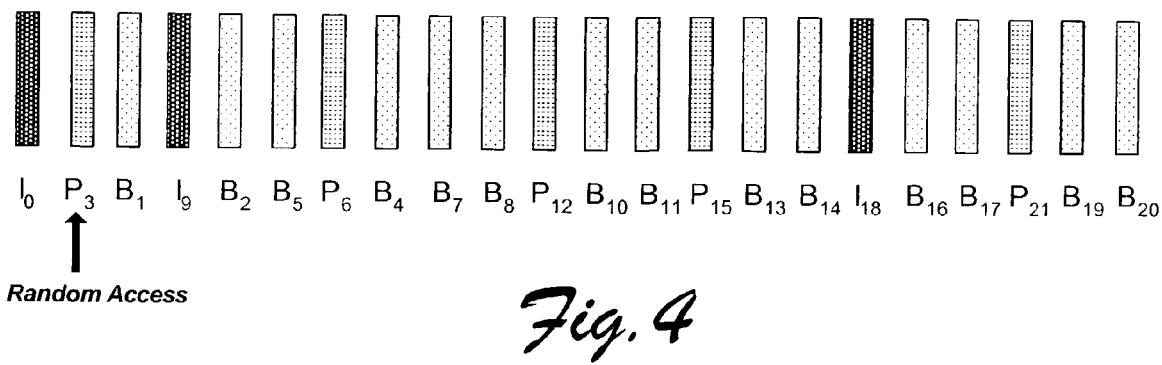
FIG. 4 illustrates a picture sequence comprising I-, B-, and P-pictures in which random access is attempted.

One concept that is retained in the new standard from the old one, although in significantly generalized form, is the distinction between transmission order (also called decoding order) and display order. In the new draft standard, any pictures that are used as anchor pictures in the decoding process of other pictures are transmitted to the decoder before the picture or pictures that refer to them. Other than this restriction that pictures are sent in the order of data dependencies, there are almost no restrictions on the order of transmission of pictures other than the capacity of the decoder to store them until they are no longer needed for reference or display purposes. Thus, if picture $P_6$ references pictures $P_3$, $I_0$, and $I_9$, it must follow them in decoding order. If picture $B_1$ references pictures $I_0$ and $P_3$, it must follow them in decoding order. If picture $B_2$ references pictures $I_0$, $P_3$, and $I_9$, it must follow them in decoding order. And if picture $B_4$ references pictures $B_2$, $P_3$, $B_5$, and $P_6$, it must follow them in decoding order. One transmission order that obeys these constraints is shown in FIG. 4.

Thus, this new standard can be briefly summarized as follows:

I-pictures are independently decodable;
I-pictures are not necessarily sent in display order;
P-pictures can reference more than one picture—that is, each different region of a P picture can reference a different picture;
P-pictures can reference not only past pictures in display order, but future pictures in display order as well, although it can only reference previous pictures in decoding order;
B-pictures can reference more than two reference pictures—that is, each region of a B-picture can reference one region of one of a number of previous pictures in decoding order or a mathematical average of two such regions;
B-pictures can reference a set of pictures that precedes the B-picture in display order, or a set of pictures that succeeds the B-picture in display order, or a set of pictures that contains some pictures that precede and some pictures that succeed the B-picture, although it can only reference previous pictures in decoding order;
B-pictures can be used as anchor pictures for reference in the decoding of other pictures, for example, they can be used to predict a P-picture.

Figure 3:
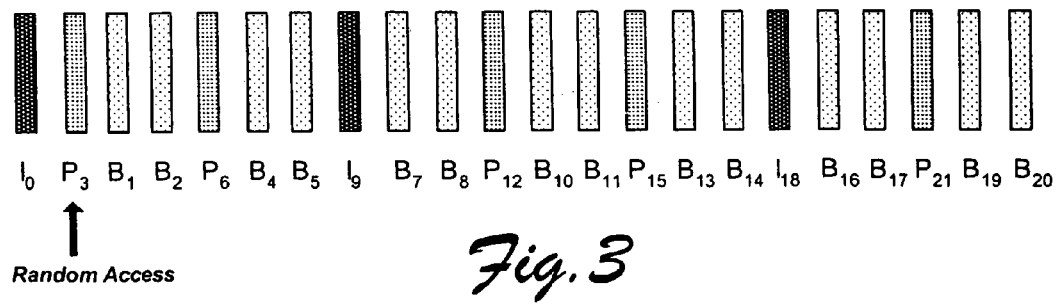
FIG. 3 illustrates a picture sequence comprising I-, B-, and P-pictures in a transmission order, and in which random access is attempted.

Now consider the problem of attempting to randomly access a picture sequence encoded in accordance with the standard described just above. Assume, for example, that the decoder attempts to randomly access the FIG. 3 sequence (which has been encoded in accordance with the standard described just above). Assume that access takes place at picture $B_8$. If one proceeds, as in the MPEG-2 approach, and scans forward to the next I-picture, this picture may not be of much use because many subsequent pictures may still depend on pictures that the decoder does not have. Hypothetically, for example, picture $P_6$ and $P_{12}$ may depend on the $I_0$ picture in addition to depending on the $I_9$ picture. So here, the decoder might not be able to decode the P-pictures despite having decoded a preceding I-picture. Pictures may also be sent long before they are needed for display, so a decoder using random access may not have any assurance of having all the pictures that need to be displayed even if it is able to decode all pictures that it encounters.

In the MPEG-2 scenario, the situation was much simpler with the use of the closed GOP flag. There, if a decoder started decoding at a random access point for which ClosedGOPflag=1, it was assured that by decoding the next I-picture, it would be able to decode and display that picture and all subsequent pictures in decoding order. There, if a decoder started decoding at a random access point for which ClosedGOPflag=0, it was assured that by decoding the next I-picture, it would be able to decode the next P-picture, and then it would be able to decode and display all of the remaining pictures of all picture types in the sequence starting with that P-picture. This is not sufficiently flexible for the standard described just above. If all that is available is a closed GOP flag, then there is no assurance that any P-pictures or B-pictures of the subsequent video that follow an I-picture can be decoded unless the flexible referencing capability of the new draft standard were to be impaired to impose this behavior. The decoder simply does not have any way to determine whether it can ever start decoding and displaying the video (except for I-pictures). The decoder must be careful about even attempting to decode any P- or B-pictures, since the decoder may be in the midst of attempting to decode some video when it suddenly encounters some region of a new picture it is trying to decode that requires referring to a picture that the decoder simply does not have.

Thus, the old approach of providing an open GOP flag is simply not enough information to provide any real random access capability for complicated video coding standards, such as the one described immediately above. A more complete indication of when the decoder can actually begin to decode and display the pictures is needed.

Random Access Points

In accordance with one embodiment, a picture sequence is provided with one or more random access points or RAPs. A random access point is effectively a location within a sequence of pictures that contains information that facilitates random access of the sequence.

Figure 5:
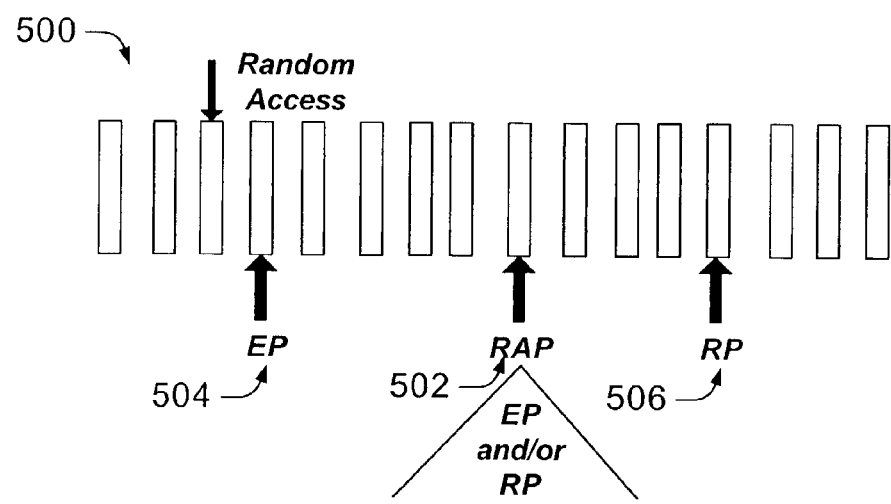
FIG. 5 illustrates a picture sequence comprising I-, B-, and P-pictures containing data in accordance with one embodiment.

As an example, consider FIG. 5 which illustrates an exemplary sequence of pictures generally at 500. This sequence has been encoded with an encoder that provides one or more random access points and the associated information that facilitates random access of the sequence. Here, a random access point or RAP 502 is indicated. Recall that a random access point can contain one or more both of the specification of an entry point and a recovery point. In this particular example, the random access point contains information associated with an entry point or EP 504, as well as information associated with a recovery point or RP 506. The entry and recovery points provide measures that a decoder can use to ascertain when its decoding activities will result in accurately and suitably decoded pictures.

In an alternative embodiment, a set of information to facilitate random access into a video sequence could be embodied in data not closely tied to a specific location in a picture sequence. For example, random access facilitation data establishing a starting point in the video stream for the decoding process to begin and establishing a later point in the video stream at which achievement of displayable video content is indicated may be contained in a separate data file or data storage area rather than being represented within the video stream at a particular location in the sequence of pictures.

Entry Points

Entry points provide a measure associated with the starting location for the decoding processing or an amount of decoding that should take place relative to some defined location such as the random access point location, to have suitably decodable and displayable pictures at some point at or after the entry point. There are a number of ways in which the entry points can be defined. One way to define an entry point is in terms of what is referred to herein as a "pre-roll count". A pre-roll count is an indication of how many pictures prior to some defined picture should have been encountered and decoded in order to be assured that some defined picture and all subsequent pictures (in display order, in decoding order, or in both display order and decoding order) can be properly decoded.

Consider the situation where the defined picture for purposes of the entry point's definition is a picture associated with the random access point or, in other words, the "current picture". In this situation, the random access point might indicate that three pictures before the current picture would have needed to have been encountered and decoded if the current picture and subsequent pictures are to be decoded for proper display from that point forward. In this example, assume that the decoder randomly accessed sequence 500 at the picture before the entry point designated "Random Access", and attempted to decode all of the pictures that it received (this is referred to as a "best efforts" decoding and is discussed in more detail in the section entitled "Best Efforts Decoding" below). In this situation, the decoder will know, by virtue of having encountered and attempted to decode the pictures subsequent to the picture at which it randomly accessed the sequence, that the current picture and all subsequent pictures can be suitably decoded and displayed.

Notice in this example that the sequence does not necessarily need to utilize a recovery point that is separate from the location of the random access point. That is, the entry point information in the random access point indicated that if decoding started at a particular picture which was, in this example, decoded by the decoder, then the current picture and all subsequent pictures will be properly decoded and displayed.

Another way in which the entry point can be defined is in terms of time. For example, the entry point can be defined in a manner that indicates to the decoder that if it started decoding ½ second or ¼ second prior to the random access point, then the current picture and all subsequent pictures can be suitably decoded and displayed.

Recovery Points

A recovery point provides a measure of a location in the video sequence to be encountered during decoding processing or how much decoding should take place after some defined location such as the location of the random access point in order to have properly decodable and displayable pictures. A recovery point can be defined in terms of picture count or time. For example, at random access point 502, the recovery point can be defined to indicate that if the decoder starts decoding at the random access point, then ½ second from then all of the pictures will be able to be properly decoded and displayed. Alternately, the recovery point can be defined in terms of picture count. That is, the random access point can define the recovery point to be 3 pictures from the current picture. Thus, if the decoder attempts to decode the next 3 pictures, then the subsequent pictures that follow will be able to be properly decoded and displayed.

Combining Entry Points and Recovery Points

In accordance with one embodiment, a random access point can contain information associated with both an entry point and a recovery point. In this situation, the random access point would be able to indicate to the decoder that if it started its decoding activities at some measured location in the past (i.e. at the entry point), then at some measured location in the future (i.e. the recovery point), all pictures will be properly decodable and displayable. For example, the entry point information might indicate that if decoding started two pictures ago, then ¼ second from now, at the recovery point, all of the pictures will be properly decodable and displayable.

Figure 6:
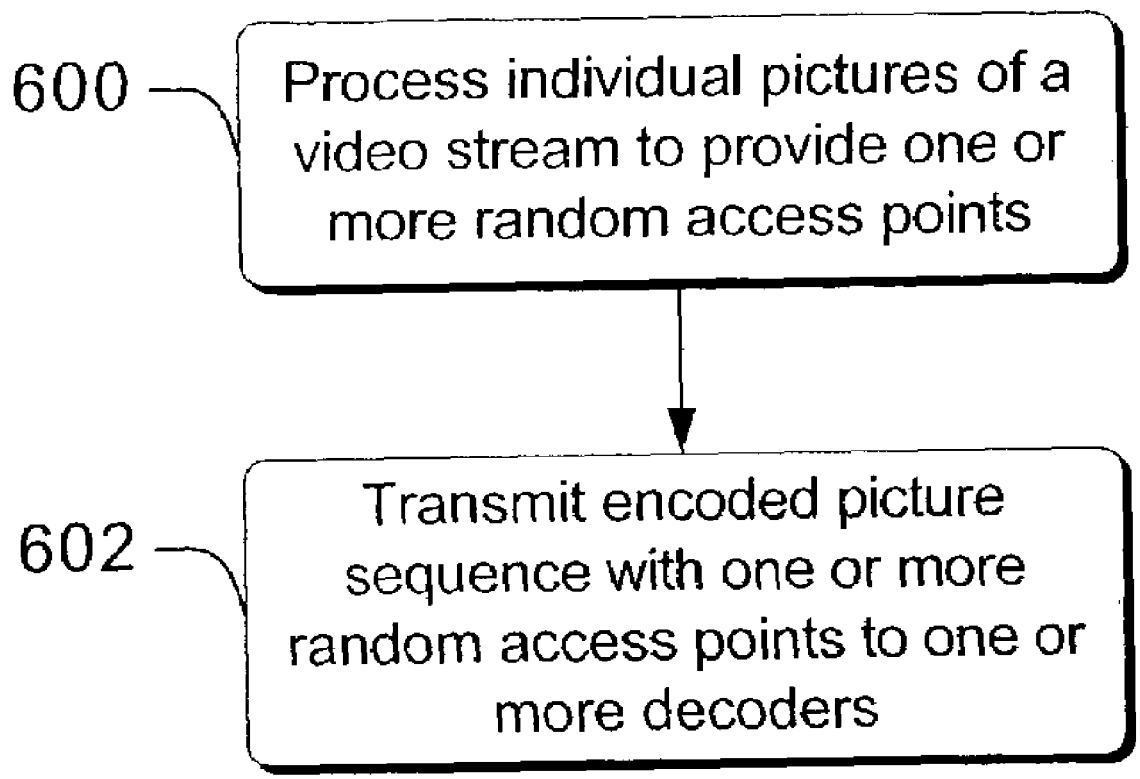
FIG. 6 is a flow diagram describing steps in a decoding method in accordance with two embodiments.

FIG. 6 is a flow diagram that describes steps in a method in accordance with one embodiment. The described method can be implemented in accordance with a suitably configured encoder.

Step 600 processes individual pictures of a video sequence to provide one or more random access points. The encoder can implement this step as it encodes individual pictures. By knowing the dependencies as between the individual pictures, the encoder is in a position to define the random access points. For example, the encoder may know that only two prior pictures are needed to decode a picture associated with a random access point. By virtue of this knowledge, the encoder can define a pre-roll count or an entry point that indicates to the decoder that it should have attempted to decode the previous two pictures if it wants to properly decode and display the current picture. Alternately or additionally, the encoder might know that if the decoder starts to decode at the current picture, then ¼-second from the current picture, all subsequent pictures can be properly decoded and displayed.

Step 602 transmits an encoded picture sequence with one or more random access points to one or more decoders. This step can be implemented in any suitable way using any suitable transmission medium.

Decoder Operation

In accordance with one embodiment, there are two fundamental ways in which a decoder can operate in connection with the above-described random access points. The first way is referred to as "best efforts decoding" and the second way is referred to as "assured decoding", each of which is discussed immediately below in its own separately titled section.

Best Efforts Decoding

When a decoder is configured to perform best efforts decoding, it will attempt to decode all of the pictures and picture regions that it sees. When the decoder sees a reference to a picture or picture region that it does not have, it can treat the reference to the missing picture as a reference to a picture filled with some such value as mid-level gray, black or some other specified or unspecified value. Alternatively, it can initialize the picture or region to be decoded to some value such as mid-level gray, black or some other specified or unspecified value. The decoder can then attempt to decode all of the pictures, but will consider the pictures completely correct in content only after the conditions indicated in the random access point are fulfilled (i.e. those conditions that are associated with the entry point and/or the recovery point).

Using the best efforts method provides encoders with maximum flexibility on how to encode subsequent pictures (for example, updating only a small part of each picture with intra information), while not necessarily burdening the decoder with work it would not already be capable of doing if it can decode the video stream at all. This method can also allow random access capabilities to be enabled using only P- or B-pictures in a sequence. Thus, random access points need not require the presence of I-pictures at or after the random access point.

Assured Decoding

Assured decoding refers to a decoding paradigm in which the decoder decodes only the pictures that it knows it can decode. For example, if the decoder sees an I-picture, it decodes the I-picture because it knows it can. If, on the other hand, the decoder sees a P-picture, the decoder does not necessarily know that it can decode the P-picture so it will not attempt to do so. So, using the FIG. 5 sequence as an example, the decoder might then start at entry point 504 and only decode I-pictures until the conditions in the random access point are fulfilled. At the point at which the conditions are fulfilled, the decoder will then attempt to decode the non-I-pictures with assurances that the remaining pictures contain no references to unavailable data.

Exemplary Decoding Methods

Figure 7:
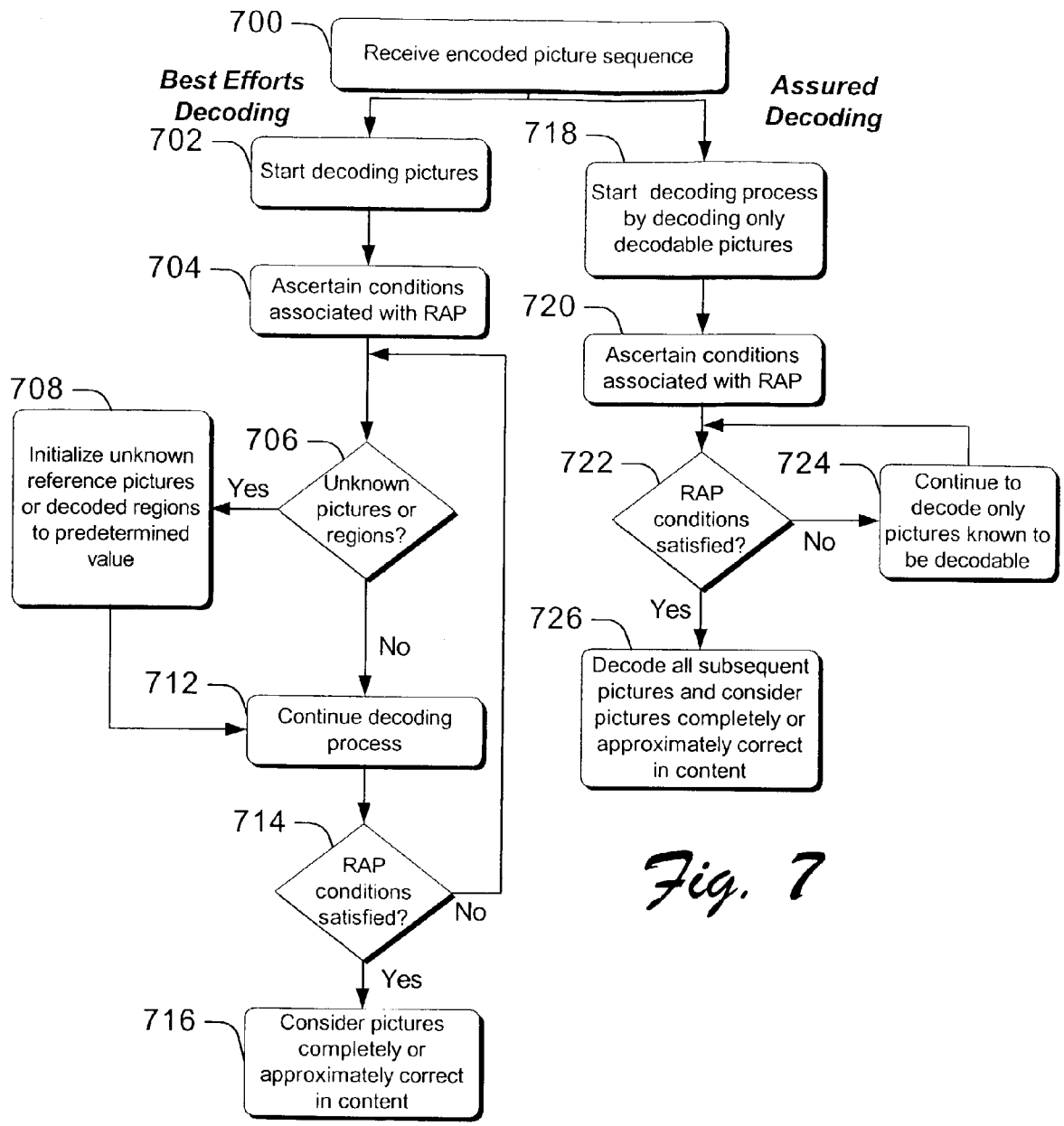
FIG. 7 is a flow diagram describing steps in a method in accordance with one embodiment.

FIG. 7 is a flow diagram that describes steps in a method in accordance with one embodiment. The flow diagram illustrates both the "best efforts decoding" and the "assured decoding" paradigm described above. The methods can be implemented in connection with any suitably configured decoder.

Step 700 receives an encoded picture sequence that has been encoded in accordance with the techniques described above. In accordance with best efforts decoding, step 702 starts decoding pictures of the sequence. Here, the decoder attempts to decode each picture to the best of its ability using a technique such as the technique described in the "Best Efforts Decoding" section above. Step 704 ascertains the conditions associated with a random access point associated with the picture sequence. Although this step is illustrated as coming after step 702, such need not be the case. In one embodiment, the conditions that are ascertained by step 704 can be defined in terms of an entry point, recovery point, or both. Step 706 determines whether a picture or picture region is unknown. A picture or a region can be unknown if it references another picture or picture region that the decoder does not have. If the picture or region is unknown, step 708 initializes the missing picture that is referenced or the picture or region to be decoded to a pre-determined value and branches to step 712 to continue the decoding process from that point forward. Examples of pre-determined values are provided above. If, on the other hand, the picture or region is known (i.e. references a picture or region that the decoder has or does not need a reference picture), then step 712 continues the decoding process directly. Step 714 determines whether the conditions in the random access point are satisfied. If the conditions are not satisfied, then the method can return to step 706 to continue the decoding process. If, on the other hand, the conditions in the random access point are satisfied, then step 716 can consider subsequent pictures as being completely or approximately correct in content.

Step 718 describes steps associated with the assured decoding process described above. Accordingly, step 718 starts decoding pictures by decoding only pictures that it knows are decodable (e.g., only I-pictures). Step 720 ascertains conditions associated with the random access point. Although this step is illustrated as coming after step 718, such need not be the case. Step 722 determines whether the conditions in the random access point are satisfied. If the conditions are not satisfied, the step 724 continues to decode only pictures that it knows are decodable. If, on the other hand, the conditions in the random access point are satisfied, step 726 decodes all subsequent pictures.

Video Splicing

Figure 8:
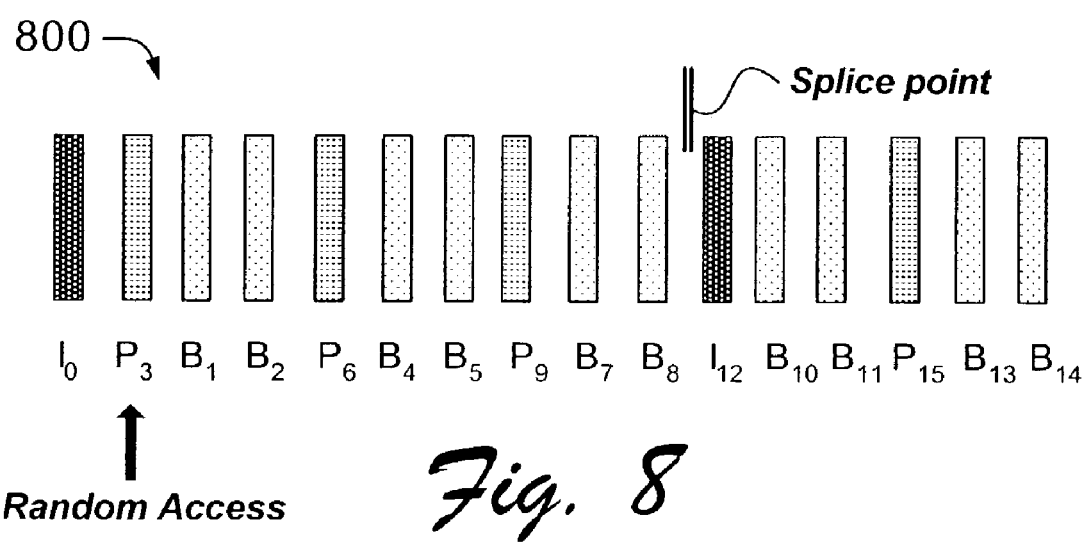
FIG. 8 illustrates a picture sequence containing a splice point and which can assist in understanding one particular context in which one or more of the embodiments can be employed.

The techniques described above can be used in connection with video splicing to facilitate the decoding process. To aid in this explanation, consider FIG. 8 which indicates a picture sequence 800. Assume that the pictures up through and including picture $B_8$ pertain to a first portion of video such as a commercial, and that the pictures from $I_{12}$ on pertain to a movie. That is, the commercial sequence and the movie sequence have been spliced together at the indicated splice point. Here, there has been a switch between video streams from a stream associated with a commercial, to a stream associated with a movie.

Now, consider the problems that this can cause if the picture stream from $I_{12}$ on is an open GOP. Here, pictures $B_{10}$ and $B_{11}$ may assume the presence of a picture $P_9$ which is before the splice point. Although there is a picture $P_9$, it is not the picture that is associated with the movie. Rather, it is the picture associated with the commercial. Thus, if the decoder decodes $B_{10}$ and $B_{11}$ using $P_9$, then the pictures will not properly decode.

In the context of MPEG-2, a 1-bit flag known as a broken link flag was used to indicate a crude splice point. If the decoder saw a broken link flag, it used the flag as an indication that there was a crude splice point and that it should either not decode the two B-pictures, or if it decodes them, it should not try to use them for anything.

In much the same way that the complex references in the above-described video coding standards complicates random accesses into the picture sequence, the complex references also complicate treatment of picture sequences that have been digitally spliced. That is, now picture $P_{15}$ may refer back to picture $P_9$ so that not only are the two B-pictures going to decode improperly, but the P-picture will decode improperly as well.

In this situation, what really matters for purposes of the decoder recovering properly-decodable pictures is what the encoder used for referencing. Thus, it is really up to the encoder to make the referencing work out in such a way that the decoder can eventually recover a reasonable picture.

Thus, in this example, at any I-picture where the encoder might do a splice, it can provide a random access point having information that can facilitate the decoding process. Specifically, the encoder can provide one or more of an entry point and a recovery point to provide the decoder with information that it can use to properly decode and display pictures proximate the splice point. So, for example, at picture $I_{12}$, the encoder might provide an indication that such crude splicing occurred along with a random access point that indicates that a suitable recovery point from the splicing operation is ½-second ahead. Thus, the decoder will know, in the context of a digitally spliced picture sequence, when it can start decoding and displaying proper pictures.

Exemplary Computing Environment

FIG. 9 illustrates an example of a suitable computing environment 900 on which the system and related methods described above can be implemented. The various components about to be described can be used to implement both suitably configured decoders and encoders.

It is to be appreciated that computing environment 900 is only one example of a suitable computing environment and is not intended to suggest any limitation as to the scope of use or functionality of the encoding/decoding system described above. Neither should the computing environment 900 be interpreted as having any dependency or requirement relating to any one or combination of components illustrated in the exemplary computing environment 900.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices. Components of the described computing system can be used to implement an encoder and a decoder that functions as described above.

In accordance with the illustrated example embodiment of FIG. 9, computing system 900 is shown comprising one or more processors or processing units 902, a system memory 904, and a bus 906 that couples various system components including the system memory 904 to the processor 902.

Bus 906 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 900 typically includes a variety of computer readable media. Such media may be any available media that is locally and/or remotely accessible by computer 900, and it includes both volatile and non-volatile media, removable and non-removable media.

In FIG. 9, the system memory 904 includes computer readable media in the form of volatile, such as random access memory (RAM) 910, and/or non-volatile memory, such as read only memory (ROM) 908. A basic input/output system (BIOS) 912, containing the basic routines that help to transfer information between elements within computer 900, such as during start-up, is stored in ROM 908. RAM 910 typically contains data and/or program modules that are immediately accessible to and/or presently be operated on by processing unit(s) 902.

Computer 900 may further include other removable/non-removable, volatile/non-volatile computer storage media. By way of example only, FIG. 9 illustrates a hard disk drive 928 for reading from and writing to a non-removable, non-volatile magnetic media (not shown and typically called a "hard drive"), a magnetic disk drive 930 for reading from and writing to a removable, non-volatile magnetic disk 932 (e.g., a "floppy disk"), and an optical disk drive 934 for reading from or writing to a removable, non-volatile optical disk 936 such as a CD-ROM, DVD-ROM or other optical media. The hard disk drive 928, magnetic disk drive 930, and optical disk drive 934 are each connected to bus 906 by one or more interfaces 926.

The drives and their associated computer-readable media provide nonvolatile storage of computer readable instructions, data structures, program modules, and other data for computer 900. Although the exemplary environment described herein employs a hard disk 928, a removable magnetic disk 932 and a removable optical disk 936, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 928, magnetic disk 932, optical disk 936, ROM 908, or RAM 910, including, by way of example, and not limitation, an operating system 914, one or more application programs 916 (e.g., multimedia application program 924), other program modules 918, and program data 920. A user may enter commands and information into computer 900 through input devices such as keyboard 938 and pointing device 940 (such as a "mouse"). Other input devices may include a audio/video input device(s) 953, a microphone, joystick, game pad, satellite dish, serial port, scanner, or the like (not shown). These and other input devices are connected to the processing unit(s) 902 through input interface(s) 942 that is coupled to bus 906, but may be connected by other interface and bus structures, such as a parallel port, game port, or a universal serial bus (USB).

A monitor 956 or other type of display device is also connected to bus 906 via an interface, such as a video adapter or video/graphics card 944. In addition to the monitor, personal computers typically include other peripheral output devices (not shown), such as speakers and printers, which may be connected through output peripheral interface 946.

Computer 900 may operate in a networked environment using logical connections to one or more remote computers, such as a remote computer 950. Remote computer 950 may include many or all of the elements and features described herein relative to computer.

As shown in FIG. 9, computing system 900 is communicatively coupled to remote devices (e.g., remote computer 950) through a local area network (LAN) 951 and a general wide area network (WAN) 952. Such networking environments are commonplace in offices, enterprise-wide computer networks, intranets, and the Internet.

When used in a LAN networking environment, the computer 900 is connected to LAN 951 through a suitable network interface or adapter 948. When used in a WAN networking environment, the computer 900 typically includes a modem 954 or other means for establishing communications over the WAN 952. The modem 954, which may be internal or external, may be connected to the system bus 906 via the user input interface 942, or other appropriate mechanism.

In a networked environment, program modules depicted relative to the personal computer 900, or portions thereof, may be stored in a remote memory storage device. By way of example, and not limitation, FIG. 9 illustrates remote application programs 916 as residing on a memory device of remote computer 950. It will be appreciated that the network connections shown and described are exemplary and other means of establishing a communications link between the computers may be used.

Conclusion

The various embodiments described above provide approaches that facilitate decoding in the context of video coding methods that allow for complicated dependencies among pictures of an encoded sequence of pictures. Particular advantages can be achieved, in some embodiments, in the context of randomly accessing picture sequences that utilize such complicated picture dependencies.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising, at a video encoder:
encoding first information for a first location in a video sequence of pictures, wherein the first location is a random access point location in the video sequence, wherein pictures at or after the random access point location are to be decoded by a video decoder, the encoded first information facilitating random access of the video sequence by the video decoder; and
transmitting the encoded first information;
wherein the encoded first information comprises second information indicating a second location in the video sequence, wherein pictures at or after, but not before, the second location are displayable with an assured level of correctness after random access, the second location being at or after the random access point location.

2. The method of claim 1 wherein the first information further comprises video splicing information.

3. The method of claim 2 wherein the video splicing information comprises a broken link flag.

4. The method of claim 1 wherein the random access point location is at an I-picture.

5. The method of claim 1 wherein the random access point location is at a P-picture.

6. The method claim 1 wherein the random access point location is at a B-picture.

7. The method of claim 1 further comprising:
encoding first information for each of one or more additional random access point locations in the video sequence.

8. A method comprising, at a video decoder:
receiving and decoding first information for a first location in a video sequence of pictures, wherein the first location is a random access point location in the video sequence, wherein the first information comprises second information indicating a second location in the video sequence, wherein pictures at or after, but not before, the second location are displayable with an assured level of correctness after random access, the second location being at or after the random access point location; and
decoding pictures at or after the random access point location, the random access point facilitating random access of the video sequence by the video decoder.

9. The method of claim 8 wherein the first information further comprises video splicing information.

10. The method of claim 9 wherein the video splicing information comprises a broken link flag.

11. The method of claim 8 wherein the random access point location is at an I-picture.

12. The method of claim 8 wherein the random access point location is at a P-picture.

13. The method claim 8 wherein the random access point location is at a B-picture.

14. A computer-readable medium having stored thereon computer-executable instructions for causing a computer to perform a method comprising, at a video encoder:
encoding first information for a first location in a video sequence of pictures, wherein the first location is a random access point location in the video sequence, wherein pictures at or after the random access point location are to be decoded by a video decoder, the encoded first information facilitating random access of the video sequence by the video decoder; and
transmitting the encoded first information;
wherein the encoded first information comprises second information indicating a second location in the video sequence, wherein pictures at or after, but not before, the second location are displayable with an assured level of correctness after random access, the second location being at or after the random access point location.

15. The computer-readable medium of claim 14 wherein the first information further comprises video splicing information.

16. The computer-readable medium of claim 15 wherein the video splicing information comprises a broken link flag.

17. The computer-readable medium of claim 14 wherein the random access point location is at an I-picture.

18. The computer-readable medium of claim 14 wherein the random access point location is at a P-picture.

19. The computer-readable medium of claim 14 wherein the random access point location is at a B-picture.

20. The computer-readable medium of claim 14 further comprising:
encoding first information for each of one or more additional random access point locations in the video sequence.

21. A computer-readable medium having stored thereon computer-executable instructions for causing a computer to perform a method comprising, at a video decoder:
receiving and decoding first information for a first location in a video sequence of pictures, wherein the first location is a random access point location in the video sequence, wherein the first information comprises second information indicating a second location in the video sequence, wherein pictures at or after, but not before, the second location are displayable with an assured level of correctness after random access, the second location being at or after the random access point location; and
decoding pictures at or after the random access point location, the random access point facilitating random access of the video sequence by the video decoder.

22. The computer-readable medium of claim 21 wherein the first information further comprises video splicing information.

23. The computer-readable medium of claim 22 wherein the video splicing information comprises a broken link flag.

24. The computer-readable medium of claim 21 wherein the random access point location is at an I-picture.

25. The computer-readable medium of claim 21 wherein the random access point location is at a P-picture.

26. The computer-readable medium of claim 21 wherein the random access point location is at a B-picture.

27. The computer-readable medium of claim 21 further comprising:
encoding first information for each of one or more additional random access point locations in the video sequence.

28. A method comprising, at a video encoder:
encoding first information for a first location in a video sequence of pictures, wherein the first location is a random access point location in the video sequence, wherein pictures at or after the random access point location are to be decoded by a video decoder, the encoded first information facilitating random access of the video sequence by the video decoder; and transmitting the encoded first information;

wherein the encoded first information comprises second information indicating a second location in the video sequence, wherein pictures at or after, but not before, the second location are displayable with an assured level of correctness after random access, the second location being at or after the random access point location; and wherein one or more of the pictures at or after the random access point location have one or more references to pictures not available to the video decoder.

29. The method of claim 28 wherein the one or more references to pictures not available to the video decoder include references to pictures before the random access point location.

30. The method of claim 28 wherein the one or more references to pictures not available to the video decoder include references to pictures before and after the random access point location.

31. The method of claim 28 wherein the one or more references to pictures not available to the video decoder include references to pictures after the random access point location.

32. The method of claim 28 wherein the one or more pictures at or after the random access point location that have one or more references to pictures not available to the video decoder include at least one P-picture.

33. The method of claim 28 wherein the one or more pictures at or after the random access point location that have one or more references to pictures not available to the video decoder include at least one B-picture.

34. The method of claim 28 wherein the one or more references to pictures not available to the video decoder are treated as referring to pictures with predetermined values.

35. The method of claim 34 wherein the predetermined values are mid-level gray values.

36. A computer-readable medium having stored thereon computer-executable instructions for causing a computer to perform a method comprising, at a video encoder:

encoding first information for a first location in a video sequence of pictures, wherein the first location is a random access point location in the video sequence, wherein pictures at or after the random access point location are to be decoded by a video decoder, the encoded first information facilitating random access of the video sequence by the video decoder; and transmitting the encoded first information;

wherein the encoded first information comprises second information indicating a second location in the video sequence, wherein pictures at or after, but not before, the second location are displayable with an assured level of correctness after random access, the second location being at or after the random access point location; and wherein one or more of the pictures at or after the random access point location have one or more references to pictures not available to the video decoder.

37. The computer-readable medium of claim 36 wherein the one or more references to pictures not available to the video decoder include references to pictures before the random access point location.

38. The computer-readable medium of claim 36 wherein the one or more references to pictures not available to the video decoder include references to pictures before and after the random access point location.

39. The computer-readable medium of claim 36 wherein the one or more references to pictures not available to the video decoder include references to pictures after the random access point location.

40. The computer-readable medium of claim 36 wherein the one or more pictures at or after the random access point location that have one or more references to pictures not available to the video decoder include at least one P-picture.

41. The computer-readable medium of claim 36 wherein the one or more pictures at or after the random access point location that have one or more references to pictures not available to the video decoder include at least one B-picture.

42. The computer-readable medium of claim 36 wherein the one or more references to pictures not available to the video decoder are treated as referring to pictures with predetermined values.

43. The computer-readable medium of claim 42 wherein the predetermined values are mid-level gray values.

44. A method comprising, at a video decoder:

receiving and decoding first information for a first location in a video sequence of pictures, wherein the first location is a random access point location in the video sequence, wherein the first information comprises second information indicating a second location in the video sequence, wherein pictures at or after, but not before, the second location are displayable with an assured level of correctness after random access, the second location being at or after the random access point location; and decoding pictures at or after the random access point location, the random access point facilitating random access of the video sequence by the video decoder;

wherein one or more of the pictures at or after the random access point location have one or more references to pictures not available to the video decoder.

45. The method of claim 44 wherein the one or more references to pictures not available to the video decoder include references to pictures before the random access point location.

46. The method of claim 44 wherein the one or more references to pictures not available to the video decoder include references to pictures before and after the random access point location.

47. The method of claim 44 wherein the one or more references to pictures not available to the video decoder include references to pictures after the random access point location.

48. The method of claim 44 wherein the one or more pictures at or after the random access point location that have one or more references to pictures not available to the video decoder include at least one P-picture.

49. The method of claim 44 wherein the one or more pictures at or after the random access point location that have one or more references to pictures not available to the video decoder include at least one B-picture.

50. The method of claim 44 wherein the one or more references to pictures not available to the video decoder are treated as referring to pictures with predetermined values.

51. The method of claim 50 wherein the predetermined values are mid-level gray values.

52. A computer-readable medium having stored thereon computer-executable instructions for causing a computer to perform a method comprising, at a video decoder:

receiving and decoding first information for a first location in a video sequence of pictures, wherein the first location is a random access point location in the video sequence, wherein the first information comprises second information indicating a second location in the video sequence, wherein pictures at or after, but not before, the second location are displayable with an assured level of correctness after random access, the second location being at or after the random access point location; and decoding pictures at or after the random access point location, the random access point facilitating random access of the video sequence by the video decoder;

wherein one or more of the pictures at or after the random access point location have one or more references to pictures not available to the video decoder.

53. The computer-readable medium of claim 52 wherein the one or more references to pictures not available to the video decoder include references to pictures before the random access point location.

54. The computer-readable medium of claim 52 wherein the one or more references to pictures not available to the video decoder include references to pictures before and after the random access point location.

55. The computer-readable medium of claim 52 wherein the one or more references to pictures not available to the video decoder include references to pictures after the random access point location.

56. The computer-readable medium of claim 52 wherein the one or more pictures at or after the random access point location that have one or more references to pictures not available to the video decoder include at least one P-picture.

57. The computer-readable medium of claim 52 wherein the one or more pictures at or after the random access point location that have one or more references to pictures not available to the video decoder include at least one B-picture.

58. The computer-readable medium of claim 52 wherein the one or more references to pictures not available to the video decoder are treated as referring to pictures with predetermined values.

59. The computer-readable medium of claim 58 wherein the predetermined values are mid-level gray values.

* * * * *